United States Patent
Kohaut

[11] Patent Number: 5,814,764
[45] Date of Patent: Sep. 29, 1998

[54] INSERT FOR POKE-THROUGH FITTING

[75] Inventor: John E. Kohaut, West Orange, N.J.

[73] Assignee: Raceway Components, Inc., Paterson, N.J.

[21] Appl. No.: 800,356

[22] Filed: Feb. 14, 1997

Related U.S. Application Data

[63] Continuation of Ser. No. 410,830, Mar. 27, 1995, abandoned, which is a continuation of Ser. No. 962,001, Oct. 14, 1992, abandoned, which is a continuation of Ser. No. 593,758, Oct. 9, 1990, abandoned.

[51] Int. Cl.⁶ ............................................ H02G 3/28
[52] U.S. Cl. .................................... 174/48; 52/220.8
[58] Field of Search .......................... 174/48, 49, 50, 174/53, 54, 55; 220/3.4, 3.3, 3.5; 52/220.8, 220.5, 220.7, 232

[56] References Cited

U.S. PATENT DOCUMENTS

| | | | |
|---|---|---|---|
| 3,995,102 | 11/1976 | Kohaut | 174/48 |
| 4,323,724 | 4/1982 | Shine | 174/48 |
| 4,433,204 | 2/1984 | Wuertz | 174/48 |
| 4,458,460 | 7/1984 | Kohaut | 174/48 X |
| 4,477,694 | 10/1984 | Kohaut | 174/48 |
| 4,496,790 | 1/1985 | Spencer | 52/220.8 X |
| 4,745,717 | 5/1988 | Domigan | 174/48 X |
| 4,770,643 | 9/1988 | Castellani et al. | 174/48 X |
| 5,032,690 | 7/1991 | Bloom | 174/48 |
| 5,243,129 | 9/1993 | Bates et al. | 174/48 |
| 5,393,930 | 2/1995 | Wuertz | 174/48 |

*Primary Examiner*—Dean A. Reichard
*Attorney, Agent, or Firm*—McAndrews, Held & Malloy, Ltd.

[57] ABSTRACT

An insert for a poke-through fitting, including a plurality of sealing elements adapted to absorb heat, expand, and flow into openings under pressure, and a plurality of insulating elements adapted to absorb heat, cure, cross-link, emit water, and dissipate heat, upon activation by heat and flame from a fire. The sealing and insulating elements are adapted to enable the fire rating of the floor in which the poke-through fitting is installed to be substantially the same with or without the hole and fitting therein, to enable the hole in the floor to be smaller to reduce the hazard of transmission of heat and flame from a fire therethrough, and to enable the capacity for passing wires to be greater in the smaller hole for increased wire capacity. The insert further includes a retaining element, assisted by compressible sealing elements, adapted to enable the insert to be retained in the hole in the floor, and, upon the exertion of increased pulling force, to be held fast in the hole in the floor, to prevent the safety hazard of electrical shock and fire from exposed live ends of pulled-apart power wires.

14 Claims, 3 Drawing Sheets

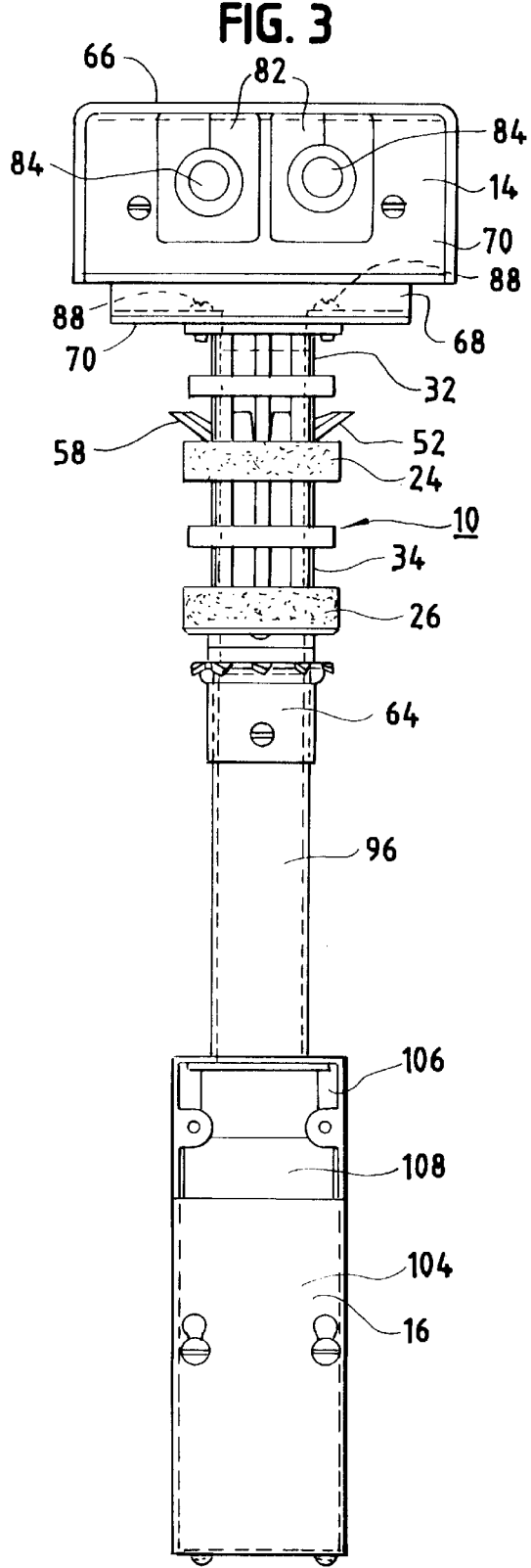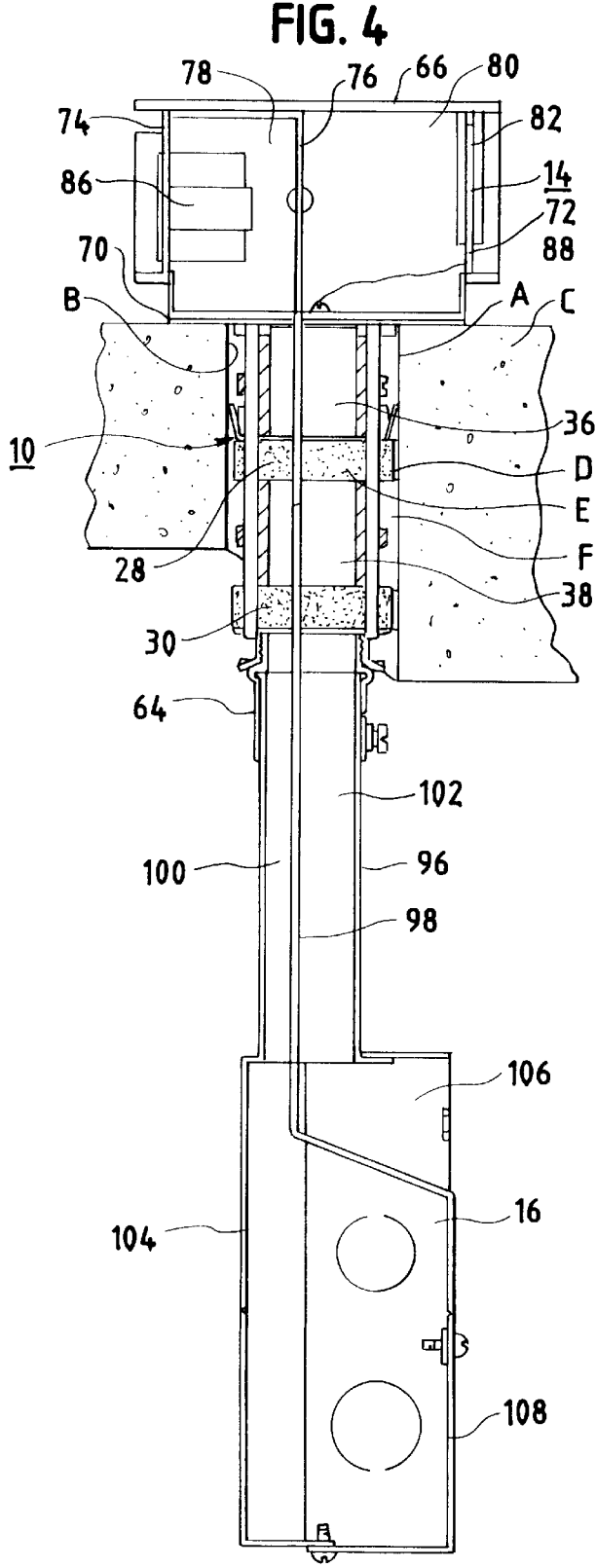

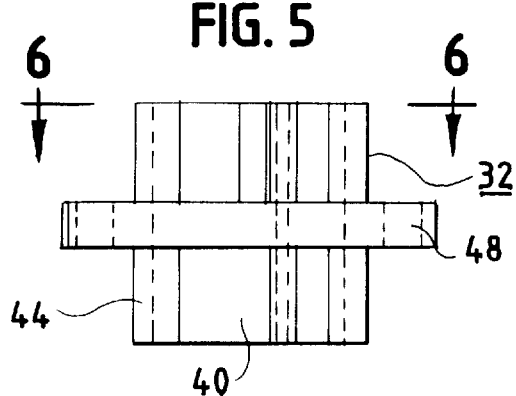
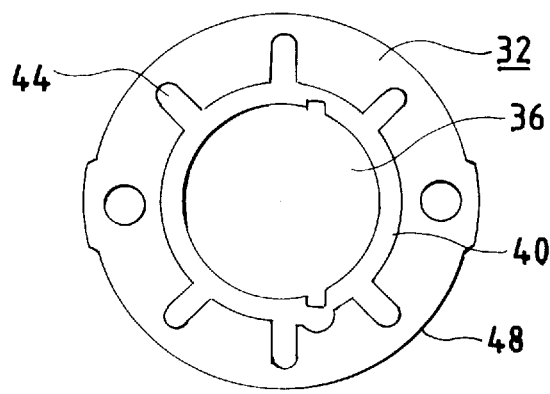
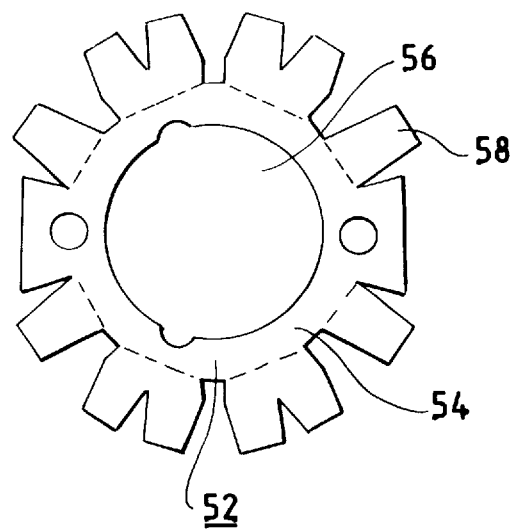

INSERT FOR POKE-THROUGH FITTING

This is a continuation of application Ser. No. 08/410,830, filed Mar. 27, 1995, presently abandoned, which was a continuation of application Ser. No. 07/962,001 filed Oct. 14, 1992, presently abandoned, which was a continuation of application Ser. No. 07/593,758 filed Oct. 9,1990, presently abandoned.

BACKGROUND OF THE INVENTION

The invention relates generally to a fitting for passing wires through a floor. It relates specifically to an insert for a poke-through fitting.

It has been known to provide a poke-through fitting for a fire-rated concrete floor, which is adapted to enable the fire-rating of the floor to be substantially the same with or without the hole. and fitting therein, as disclosed, for example, in Kohaut U.S. Pat. No. 3,995,102, and Castellani et al. U.S. Pat. No. 4,770,643.

It has been further known to also form a smaller hole for such insert for a poke-through fitting, for example of a nominal two inch diameter, as compared to a three inch diameter hole, to remove less concrete from the floor and to therefore do less structural damage to the concrete, to reduce the hazard of the concrete cracking, and to reduce the hazard of transmission of heat and flame from a fire therethrough, and to provide a smaller insert part of the fitting to enable installation in the smaller hole, as disclosed, for example, in Kohaut U.S. Pat. No. 4,477,694.

However, the capacity for passing power and non-power wires, including electrical, telephone, data, and/or other wires, through the insert part of the fitting in the smaller hole was small, whereas the need for larger wire capacity in such smaller fittings has greatly increased with expanded office electrification, communication, and data requirements, as for de-mountable partitions, electrified modular furniture, larger numbers of computer workstations, and highly sophisticated computer workstations. Further, if increased numbers and/or size of wires are used, that increases the capacity in the insert part of the fitting to transmit heat and flame from a fire through the wires and through the fitting, creating substantial fire and electrical safety hazards, jeopardizing the fire-rating of the floor, jeopardizing approval of the fitting for classification as meeting fire and electrical safety standards of certified testing laboratories, and creating potential violations of fire and electrical safety codes.

Further, it has been known to provide a fitting which includes a retainer to enable simplified installation in the hole and to prevent pulling of the fitting out of the hole, as disclosed, for example, in Shine U.S. Pat. No. 4,323,724. However, requirements for preventing the fitting from being pulled out of the hole have increased with the increased numbers and/or sizes of wires to be used, because of the resulting increased safety hazard of fire and electrical shock from exposed live ends of pulled apart power wires.

Further, it has been known to provide a fitting which includes a fixed barrier therein for separating power wires and non-power wires passing therethrough, as disclosed, for example, in the above patents. However, it is often necessary to change the fitting at the site where it is installed to enable use of a service head which provides an outlet only for power wires or only for non-power wires.

Further, it has been known to provide a fitting which includes a junction box, as disclosed, for example, in the above patents. However, with increased use of wires, it has become useful to have a sleeve in the junction box for enabling conduit for wires to pass therethrough.

SUMMARY OF THE INVENTION

The insert of the invention is adapted to overcome the above problems, as well as others, associated with known inserts.

The insert of the invention is adapted to enable the fire rating of the floor to be substantially the same with or without the hole and fitting therein, to enable the hole in the floor to be smaller, to remove less concrete form the floor and to therefore do less structural damage to the concrete, to reduce the hazard of the concrete cracking, and to reduce the hazard of transmission of heat and flame from a fire therethrough, and to enable the capacity for passing wires to be greater in the smaller hole for increased wire capacity.

It includes a plurality of elements for sealing the hole in the floor and the wires passing through the insert, upon activation by heat and flame from a fire. The sealing elements, in non-activated condition, provide openings about the insert and about the wires upon insertion of the insert in the hole, and, upon activation, absorb heat, expand and flow into the openings about the insert and about the wire.

It further includes a plurality of elements for dissipating heat upon activation by heat and flame from a fire. The heat dissipating elements are positioned adjacent the plurality of sealing elements, to provide an increased opening about the insert for enabling increased flow and expansion of the sealing elements upon activation of the sealing elements and to provide increased insulation and prevent trapping of the sealing elements in small areas, and absorb heat, cure, cross-link, emit water, and dissipate heat upon activation of the heat dissipating elements.

The insert is further adapted to be retained in the hole in the floor and, upon exertion of increased pulling force, to be held fast in the hole in the floor, to prevent the safety hazard of electrical shock and fire from exposed live ends of pulled-apart power wires.

It includes a retainer element for gripping the wall of the hole upon insertion of the insert in the hole in the floor, and upon exertion of increased pulling force on the insert. Further, the sealing elements are adapted to be compressible to expand outwardly and bear against the wall of the hole upon exertion of increased pulling force on the insert, to assist the retainer element in holding the insert fast in the hole.

The insert is further adapted to provide a barrier for separating power and non-power wires, which is removable at the site where the insert is installed, to enable use of the insert for power wires only or for non-power wires only.

The insert is further adapted to be pre-wired, to enable installation, in the hole in the floor, of an assembly of parts of a fitting including the insert and a service head as a unit.

The fitting, of which the insert is a part, is further adapted to provide a sleeve for a junction box to enable conduit for wires to pass therethrough.

BRIEF DESCRIPTION OF THE DRAWINGS

FIG. 3 is a rear elevational view of a poke-through fitting including an insert forming a part thereof in a second embodiment of the invention;

FIG. 4 is a side elevational view of the poke-through fitting in the second embodiment of the invention;

FIG. 5 is an elevational view of an insulator element which is a part of the insert of the invention;

FIG. 6 is a top plan view of the insulator element taken along line 6—6 in FIG. 5; and FIG. 7 is a top plan view of a retainer element which is a part of the insert of the invention.

DESCRIPTION OF THE PREFERRED EMBODIMENTS

The insert 10 of the invention, in the preferred embodiments shown in FIGS. 1–7 and described below, is adapted to form a part of a poke-through fitting 12, which may further include a service head 14 and a junction box 16.

Insert 10, as shown in FIG. 4, is adapted to fit in a hole A having a wall B formed in a fire-rated concrete floor C, to enable an activated wire or plurality of wires to pass therethrough to activate service head 14 as an outlet therefor. Hole A may be formed by core-drilling concrete floor B. The activated wire or wires may comprise power, telephone, data, and/or other wires, which originate from sources below floor B and pass through insert 10 to or through service head 14. The power wires include insulation and may be pre-wired to run from junction box 16, through insert 10, to service head 14.

Insert 10 is further adapted to enable the fire rating of floor C to be substantially the same with or without hole A and fitting 12 therein. It is further adapted to enable hole A in floor C to be smaller, for example two inches in diameter, as compared to a three-inch diameter hole, to reduce the hazard of transmission of heat and flame from a fire therethrough. It still further is adapted to enable the capacity for passing wires to be greater in the smaller hole, for example to pass up to seven No. 12 power wires and up to twenty-five pair No. 22 telephone wires, for a maximum aggregate cross section of No. 12 and/or No. 22 wires of up to 0.06094 square inches, as compared to three No. 12 wires, for maximum cross-section wire capacity.

Figure 2:
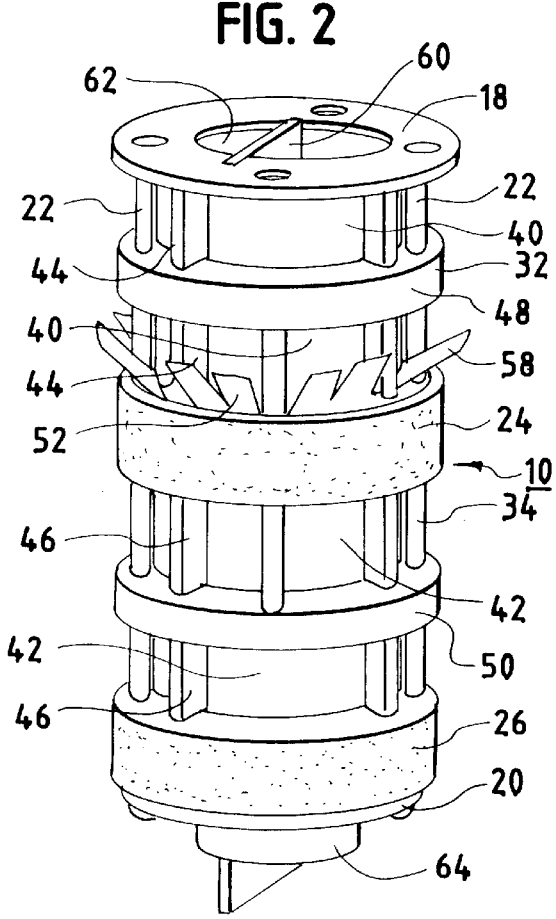
FIG. 2 is a perspective view of an insert of the invention.

Insert 10, as shown in FIG. 2, includes a top steel plate 18, a bottom steel plate 20, and a pair of fastening rivets 22 which extend through, interconnect, and secure together top and bottom plates 18 and 20, and the other parts of insert 10.

Insert 10, as shown in FIGS. 2 and 4, further includes upper ring 24 and lower ring 26, each of which has fastening rivets 22 extending therethrough, and a central opening 28 and 30 through which the wires pass. Upper ring 24 and lower ring 26 are each comprised of a material, adapted, and in non-activated condition, to provide openings D and E about insert 10 and about the wires, between the outer surface of rings 24 and 26 and wall B of hole A, and in central openings 28 and 30. Such material is further adapted, upon activation by heat and flame from a fire, to activate and flow into the openings about insert 10 and about the wires.

Upper ring 24 and lower ring 26 are preferably comprised of an intumescent material, which, upon activation by heat and flame from a fire, expands into the openings about insert 10, about the wires, and through the wire insulation, under pressure.

The intumescent material of which upper ring 24 and lower ring 26 are each preferably comprised is "ALVA-TECH Fire Barrer Sheet FB525" manufactured by Alva-Tech, Inc., Asbury Park, N.J. "ALVA-TECH Fire Barrer FB525" is an intumescent material which, when exposed to heat and flame from a fire, absorbs heat and begins to expand at a relatively low temperature (at about 250° F.). It expands in all directions rapidly and very substantially (for example, to about 1.5 times original size at about 250° F., and to about 6.3 times original size at about 500° F.) and the resultant flexible foam seals openings, and expands into the spaces remaining after the fire and heat burns and melts the insulation off the wires, to enclose and seal the wires, forming an insulating barrier to retard the spreading of flames and to control temperature increase. It forms a very strong refractory char as the temperature continues to rise, which seals openings to form an efficient heat and smoke barrier, retarding transmission of heat and flame from a fire.

Insert 10 further includes upper insulator 32 and lower insulator 34, each of which is generally cylindrical-shaped, has fastening rivets 22 passing through a portion thereof, and includes a central opening 36, 38 through which the wires pass. Upper insulator 32 and lower insulator 34 are each comprised of a material adapted to dissipate heat and to provide an increased opening about insert 10 for enabling increased expansion of intumescent material from upper intumescent ring 24 and lower intumescent ring 26 upon activation by heat and flame from a fire to provide better insulation.

Upper insulator 32 and lower insulator 34, as shown in FIGS. 2, 5 and 6, each include reduced diameter portions 40, 42, adapted to form a larger opening F between the outer surface of insert 10 and wall B of hole A, for enabling increased expansion of the intumescent material of which upper intumescent ring 24 and lower intumescent ring 26 are comprised, upon activation by heat and flame from a fire. They each further include portions for providing mechanical stability, including a plurality of fins, as 44 in upper insulator 32, and 46 in lower insulator 34, radiating in the longitudinal direction at spaced-apart locations on the outer surface of reduced diameter portions 40 and 42 of upper insulator 32 and lower insulator 34. Fins 44 and 46 are adapted to abut upper intumescent ring 24 and lower intumescent ring 26. Upper insulator 32 and lower insulator 34 further include a ring portion 48, 50 radiating in a lateral direction from the outer surface of upper insulator 32 and lower insulator 34, through which fastening rivets 22 extend.

Upper insulator 32 and lower insulator 34 are preferably comprised of a partially-cured phenolic material which, upon activation, cures, cross-links, and emits water to dissipate heat in and about insert 10.

The partially-cured phenolic material of which upper insulator 32 and lower insulator 34 are each preferably comprised is "Plenco 552", manufactured by Plastics Engineering Company, Sheboygan, Wis. "Plenco 552" is a thermo-setting glass fiber reinforced phenolic compound, pelletized for improved moldability, which has improved impact and electrical properties, and dimensional stability and moldability.

Insert 10 further includes a retainer 52, adapted to retain insert 10 in hole A upon exertion of increased pulling force so as to hold insert 10 fast in hole A, for example, withstanding one-hundred fifty to two-hundred ten pounds of upward pulling force without insert 10 being pulled out of hole A.

Retainer 52, as shown in FIGS. 2 and 7, includes a ring-shaped generally-planar portion 54, having an opening 56 through which the wires pass, and a plurality of tabs 58, each projecting at an angle relative to the outer periphery of planar portion 54. Tabs 58 are adapted to grip wall B of hole A to retain insert 10 in hole A, and, upon exertion of increased pulling force on insert 10, to hold insert 10 fast in hole A, preventing the hazard of electrical shock and fire from exposed live ends of pulled-apart power wires. Tabs 58 are preferably comprised of a flexible resilient spring material. The preferred angle of projection of tabs 58 relative to planar portion 54 is thirty degrees prior to insertion of insert 10 in hole A.

The intumescent material of which upper intumescent ring 24 and lower intumescent ring 26 are comprised is further preferably compressible, such that it is adapted to compress, expand outwardly, and bear against wall B of hole A upon exertion of increased pulling force on insert 10 to assist retainer 52 in holding insert 10 fast in hole A.

Insert 10 further includes barrier 60, adapted to divide channel 62, formed by the central openings in the parts of insert 10, into separate channels for power wires and for non-power wires to pass therethrough. Barrer 60 is preferably removable at the site where insert 10 is inserted in hole A, to enable use of channel 62 for only power wires or only non-power wires.

Insert 10 further includes a coupling 64, adapted to enable connection of junction box 16 thereto.

Figure 1:
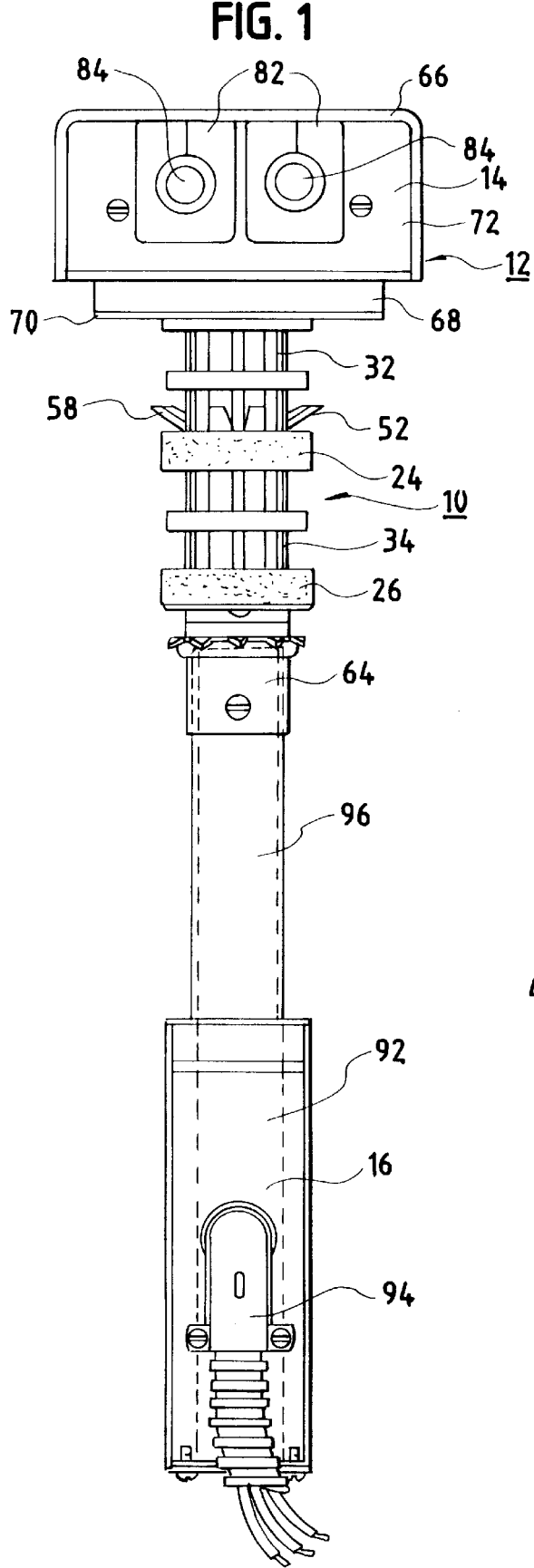
FIG. 1 is a rear elevational view of a poke-through fitting including an insert forming a part thereof in a first embodiment the invention.

Service head 14, as shown in FIGS. 1, 3 and 4, includes a housing cover 66, a base 68 including a gasket 70 to seal base 68, and outlet face plates 72 and 74, adapted to be connected together to form service head 14 having a chamber therein. Service head 14 further includes a barrier 76, adapted to divide the chamber into separate chambers 78 and 80 for power wires and for non-power wires.

Outlet face plate 72 may comprise a telephone wire outlet, which includes a pair of grommets 82 mounted therein having openings 84 for passing telephone wires therethrough. Outlet face plate 74 may comprise a power wire outlet, which includes a receptacle 86 mounted therein, for connecting power wires thereto to enable activation thereof, which may be pre-wired to enable installation of service head 14 and insert 10 as a unit, adapted to receive power plugs. Screws 88 are adapted to connect service head 14 to insert 10.

Service heads other than as shown in the Figures, adapted to form part of poke-through fitting 12 with insert 10, may comprise power outlets only, non-power outlets only, or a plurality of power and non-power outlets, for example, two double-plug receptacles and a plurality of outlets for telephone, data, and/or other wires.

Junction box 16, as shown in FIG. 1 in a pre wired embodiment, includes a bracket-wire connector plate 92, adapted to enable a wire connector 94 to be connected thereto, and a conduit 96 adapted to be connected to coupling 644 for connecting junction box 16 to insert 10. Conduit 96 includes a power barrier 98, adapted to separate the channel therein into a power raceway 100 for passing power wires, and a non-power raceway 102 for passing non-power wires. A bracket 104, as shown in FIGS. 3 and 4, is also included in the pre-wired embodiment of junction box 16 in FIG. 1.

Junction box 16, as shown in FIGS. 3 and 4 in conduit wiring embodiment, includes bracket 104, a sleeve 106 for enabling conduit for wires to pass therethrough, a cover-power barrier 108, and conduit 96 adapted to be connected to coupling 64 for connecting junction box 16 to insert 10.

Plate 92 and connector 94 for the pre-wired embodiment of junction box 16, and sleeve 106 and barrier 108 for the conduit wiring embodiment of junction box 16, may be shipped together for alternate use on site as needed.

Junction connections and junction boxes other than as shown in the Figures may be used to form a part of poke-through fitting 12.

Fitting 12, in a single service embodiment for either power or non-power wires, not shown, may include a junction box 16 including a conduit sleeve 106, and conduit 96, in which power barrier 98 is removed, insert 10, in which barrier 60 is removed, and service head 14, in which barrier 76 is removed, to enable use of the entire area in service head 14 for the single service.

To install insert 10, and poke-through fitting 12 of which it forms a part, in floor C, floor C may be core-drilled to form hole A having wall B, using preferably a two-inch core bit.

An assembly including a disposable protective steel plate which is connected to insert top steel plate 18 by connecting screws 88, may then be oriented for the desired direction of receptacle 86 in power outlet face plate 72, and the assembly may be pushed into hole A, until the protective plate is seated on floor C. Tabs 58 of retainer 52 flex and grip wall B of hole A to retain insert 10 in hole A.

The protective plate may then be removed from connection to insert 10, as by loosening connecting screws 88. Base 68 of service head 12 may then be connected to insert 10 as by positioning same over the connecting screws 88, moving base 68 such that it is engaged by the connecting screws 88, and tightening connecting screws 88.

The power wires may then be connected to receptacle 86 in power outlet face plate 72. Barrier 76 may then be inserted into base 68, and power outlet face plate 74, non-power outlet face plate 72, and housing 66 are then attached to base 68. Junction box 16 may then be connected to insert 10 at coupling 64, and activated wires may then be connected in, and/or pulled through, fitting 12. Insert 10 may then be shipped with conduit 96 attached to bracket 104 and connected to coupling 64. Service head 14 and insert 10 and junction box 16 may be pre-wired as shown in FIG. 1, to enable installation thereof as a unit in hole A.

To remove fitting 12 and abandon the location where fitting 12 was installed, all power and non-power wires are disconnected, service head 14 is removed and insert 10 and junction box 16 are pushed through hole A for reuse at another location. To maintain the fire-rating of the floor at the abandoned location, a fire-rated abandoning fitting may be installed. To abandon a fitting 12 without removing it, service head 14 may be removed, and a fire-rated abandoning plate may be connected to insert 10 and installed at the abandoned location.

In operation, upon occurrence of a fire below floor C, heat and flame from the fire rise through hole A, activating the fire transmission preventing elements in insert 10.

Lower intumescent ring 26 and upper intumescent ring 24 absorb heat, and are activated to expand into openings in hole A, about lower insulator 34 and upper insulator 32, about the remainder of insert 10, about the wires, and through the wire insulation, under pressure. They form flexible foam seals, sealing openings, enclosing and sealing the wires upon the insulation being burned off, and forming very strong refractory chars. They seal openings to form efficient heat and smoke barriers, retarding transmission of heat and flame from the fire.

Lower insulator 34 and upper insulator 32 are activated to absorb heat, and to cure, cross-link, and emit water to dissipate heat in and about insert 10, and to provide increased openings about insert 10 for enabling increased expansion of lower intumescent ring 26 and upper intumescent ring 24 upon activation by heat and flame from the fire to provide better insulation.

Upon the occurrence of the exertion of upward pulling force on insert 10 of fitting 12, through service head 14, tabs 58 of retainer 52 grip wall B of hole A to hold insert 10 fast in hole A, preventing the hazard of electrical shock and fire from exposed live ends of pulled-apart power wires. Upper intumescent ring 24 and lower intumescent ring 26 are compressible upon exertion of upward pulling force, and compress, expand outwardly, and bear against wall B of hole A to assist tabs 58 in holding insert 10 fast in hole A.

Upon the occurrence of heat and flame from a fire, insert 10 is adapted to be activated to prevent the transmission of heat and flame from the fire therethrough. Insert 10 enables the fire rating of floor C to be substantially the same with or without hole A and fitting 12 therein, enables hole A in floor C to be smaller to reduce the hazard of transmission of heat and flame from a fire therethrough, and enables the capacity for passing wires to be greater in the smaller hole A for increased cross-section wire capacity.

Upper intumescent ring 24 and lower intumescent ring 26 are adapted to be activated to seal hole A and the wires passing through insert 10 by expanding and flowing into the openings about insert 10 and about the wires. Upper insulator 32 and lower insulator 34 are adapted to be activated to absorb and dissipate heat, and to be positioned adjacent upper intumescent ring 24 and lower intumescent ring 26 to provide an increased opening about insert 10 enabling increased expansion of upper intumescent ring 24 and lower intumescent ring 26.

Further, upon installation of insert 10 in hole A, tabs 58 of retainer 52 are adapted to retain insert 10 in hole A, and upon exertion of increased pulling force, tabs 58 of retainer 52, and compressible upper intumescent ring 24 and lower intumescent ring 26, are adapted to hold insert 10 in hole A, to prevent the safety hazard of electrical shock and fire from exposed line ends of pulled-apart power wires.

Barrier 60 of insert 10 is adapted to be removable at the site where insert 10 is installed, to enable use of channel 62 for power wires only or for non-power wires only.

Insert 10 is adapted to be pre-wired, to enable installation in hole A of an assembly of service head 14 and insert 10 as a unit. Junction box 16 is adapted to include a sleeve 106 for enabling conduit for wires to pass therethrough.

Preferred embodiments of the invention have been set forth above, for the purpose of explaining the invention. However, it is to be understood that variations in such embodiments may be within the scope and spirit of the invention as set forth in the claims.

I claim:

1. A poke-through service fitting, adapted to be installed in a nominally two-inch diameter opening formed at a selected location in a fire-rated floor, for enabling source service cables, positioned below the floor, to pass through the fitting, for activation of devices adapted to be operable by connection to the fitting, and further adapted to retard the transmission of heat and flame from a fire from a floor below through the floor opening and fitting and to the floor, for enabling the fire rating of the floor to be substantially the same with or without the floor opening and fitting therein, and which fitting further provides a substantial volume for passing the source service cables therethrough, comprising (a) a service head;
(b) an insert, for activation by source service cables, adapted to be positioned in the floor opening, including a raceway for passing the source service cables therethrough;
(c) means for retarding the transmission of heat and flame from a fire through the floor opening and the fitting to the floor, adapted to enable the fire rating of the floor to be substantially the same with or without the floor opening and fitting therein, and adapted to be positioned in the insert, comprising means for sealing the floor opening and service cables upon activation by heat and flame from a fire, adapted, in non-activated condition, to provide openings about the insert and the service cables upon inserting the insert in the floor opening, and to absorb heat, expand, and flow into the openings about the insert and about the service cables upon activation by heat and flame from a fire, and means for dissipating heat upon activation by heat and flame from a fire, positioned adjacent the sealing means, adapted to enable increased expansion of the sealing means upon activation by heat and flame from a fire;
(d) means for connecting the service head to the insert; and
(e) means for resisting pulling of the fitting out of the floor opening, adapted to be positioned in the insert, comprising a ring-shaped generally planar retainer, having an opening through which the source service cables are adapted to pass, including a plurality of tabs projecting from an outer periphery at a generally acute outer angle relative to an outer peripheral plane of the retainer, adapted to grip a wall of the floor opening upon insertion of the insert into the floor opening, and upon exertion of increased pulling force on the insert, to resist pulling of the fitting out of the floor opening, comprised of flexible resilient spring material, further comprising means for stabilizing the heat dissipating means, comprising a plurality of fins, extending generally parallel to a longitudinal axis of the insert, radiating in the longitudinal direction at spaced apart locations on an outer surface of the heat dissipating means, adapted to abut the sealing means.

2. The fitting of claim 1, wherein the stabilizing means further comprise a ring, radiating in a lateral direction from the outer surface of the heat dissipating means, through which a securing means is adapted to extend.

3. A poke-through service fitting, adapted to be installed in a nominally two-inch diameter opening formed at a selected location in a fire-rated floor, for enabling source service cables, positioned below the floor, to pass through the fitting, for activation of devices adapted to be operable by connection to the fitting, and further adapted to retard the transmission of heat and flame from a fire from a floor below through the floor opening and fitting and to the floor, for enabling the fire rating of the floor to be substantially the same with or without the floor opening and fitting therein, and which fitting further provides a substantial volume for passing the source service cables therethrough, comprising:

(a) a service head;
(b) an insert, for activation by source service cables adapted to be positioned in the floor opening, including a raceway for passing the source service cables therethrough;
(c) means for retarding the transmission of heat and flame from a fire through the floor opening and the fitting to the floor, adapted to enable the fire rating of the floor to be substantially the same with or without the floor opening and fitting therein, and adapted to be positioned in the insert, comprising means for sealing the floor opening and service cables upon activation by heat and flame from a fire, adapted, in non-activated condition, to provide openings about the insert and the service cables upon inserting the insert in the floor opening, and to absorb heat, expand, and flow into the openings about the insert and about the service cables upon activation by the heat and flame from a fire, further comprising means for dissipating heat upon activation by heat and flame from a fire positioned adjacent the sealing means, adapted to enable increased expansion of the sealing means upon activation by heat and flame from a fire;

(d) means for connecting the service head to the insert; and (e) means for stabilizing the heat dissipating means, comprising a plurality of fins, extending generally parallel to a longitudinal axis of the insert, radiating in the longitudinal direction at spaced apart locations on an outer surface of the heat dissipating means, adapted to abut the sealing means.

4. The fitting of claim 3, wherein the stabilizing means further comprise a ring, radiating in a lateral direction from the outer surface of the heat dissipating means, through which a securing means are adapted to extend.

5. The fitting of claim 3, further comprising source services cables connected to the fitting, wherein the fire transmission retarding means are comprised of intumescent material.

6. The fitting of claim 3, further comprising source service cables connected to the fitting, wherein the volume of service cables which pass through the raceway is substantially equivalent to an aggregate cross section of six-thousand ninety-four ten-thousandths of an inch.

7. The fitting of claim 3, further comprising source service cables connected to the fitting, wherein the service cables comprise power cables which pass through the raceway, and in which the volume of power cables which pass therethrough are substantially equivalent to seven number-twelve power wires.

8. The fitting of claim 3, further comprising source service cables connected to the fitting, wherein the source service cables further comprise communication cables, and in which the volume of communication cables which pass therethrough are substantially equivalent to twenty-five pair number twenty-two communication wires.

9. The fitting of claim 3, wherein the source service cables comprise different types of source service cables, further comprising means for dividing the insert raceway into a plurality of separate channels, for enabling each of the different types of source service cables to pass separately therethrough.

10. The fitting of claim 9, wherein the dividing means comprise a barrier, adapted to extend in the raceway parallel to a lengthwise axis thereof.

11. The fitting of claim 3, wherein the source service cables include power service cables, and the service head includes a receptacle mounted therein, and power wires, pre-wired to the receptacle and passing through the insert raceway, further comprising a junction for enabling the power service cables positioned below the floor to be connected to the power wires for activating the receptacle.

12. The fitting of claim 11, further comprising source service cables connected to the fitting, a conduit for encasing the power service cables, and wherein the junction includes a sleeve for encasing the portion of the power service cables adapted to be connected to the power wires.

13. The fitting of claim 3, further comprising means for resisting pulling of the fitting out of the floor opening, adapted to be positioned in the insert, comprising a ring-shaped generally planar retainer, having an opening through which the source service cables are adapted to pass, including a plurality of tabs projecting from an outer periphery at a generally acute outer angle relative to an outer peripheral plane of the retainer, adapted to grip a wall of the floor opening upon insertion of the insert into the floor opening, and upon exertion of increased pulling force on the insert, to resist pulling of the fitting out of the floor opening, comprised of flexible resilient spring material.

14. The fitting of claim 13, wherein the angle of projection of the tabs from the outer peripheral plane of the retainer is about thirty degrees prior to insertion of the fitting in the floor opening.

* * * * *